(12) United States Patent
Hodgson et al.

(10) Patent No.: US 10,451,059 B2
(45) Date of Patent: Oct. 22, 2019

(54) PUMP FOR CONVEYING A FLUID, IN PARTICULAR FOR CONVEYING AN EXHAUST GAS CLEANING ADDITIVE

(71) Applicant: Continental Automotive GmbH, Hannover (DE)

(72) Inventors: Jan Hodgson, Troisdorf (DE); Yves Kopp, Remering-les-Puttelange (FR); Georges Maguin, Marly (FR)

(73) Assignee: Continental Automotive GmbH, Hannover (DE)

( * ) Notice: Subject to any disclaimer, the term of this patent is extended or adjusted under 35 U.S.C. 154(b) by 138 days.

(21) Appl. No.: 15/506,117

(22) PCT Filed: Aug. 27, 2015

(86) PCT No.: PCT/EP2015/069608
§ 371 (c)(1),
(2) Date: Feb. 23, 2017

(87) PCT Pub. No.: WO2016/030446
PCT Pub. Date: Mar. 3, 2016

(65) Prior Publication Data
US 2018/0216615 A1    Aug. 2, 2018

(30) Foreign Application Priority Data

Aug. 28, 2014  (DE) .................. 10 2014 112 390

(51) Int. Cl.
*F04C 5/00*       (2006.01)
*F01N 3/20*       (2006.01)
(Continued)

(52) U.S. Cl.
CPC .............. *F04C 5/00* (2013.01); *F01N 3/2066* (2013.01); *F04B 43/14* (2013.01); *F04B 53/16* (2013.01);
(Continued)

(58) Field of Classification Search
CPC ........ F04C 5/00; F04C 15/0015; F04B 53/16; F04B 43/14; F04B 43/1238; F01N 3/2066
See application file for complete search history.

(56) References Cited

U.S. PATENT DOCUMENTS 664,507 A  * 12/1900  Singer ................ F04B 43/1238
                                                        417/476
2,544,628 A     3/1951  Copping
(Continued)

FOREIGN PATENT DOCUMENTS

CN       103534484      1/2014
CN       105452660      3/2016
(Continued)

*Primary Examiner* — Deming Wan
(74) *Attorney, Agent, or Firm* — Cozen O'Connor (57) ABSTRACT

A pump for conveying a fluid includes a pump housing, an eccentric, a deformable element arranged in a pump gap between the inner circumferential surface of the pump housing, and an outer surface of the eccentric, such that a conveying channel is formed from an inlet to an outlet. A stationary seal is provided between the outlet and the inlet and prevents a backflow of the fluid from the outlet back to the inlet. The inner circumferential surface of the pump housing has a recess in the region of the stationary seal, and the deformable element is tensioned fluid-tight at the inner circumference surface in the region of the recess using a pin.

9 Claims, 4 Drawing Sheets

(51) Int. Cl.
*F04B 43/14* (2006.01)
*F04B 53/16* (2006.01)
*F04C 15/00* (2006.01)
*F04B 43/12* (2006.01)

(52) U.S. Cl.
CPC .. *F04C 15/0015* (2013.01); *F01N 2610/1433* (2013.01); *F04C 2210/1083* (2013.01); *Y02A 50/2325* (2018.01); *Y02T 10/24* (2013.01)

(56) References Cited

U.S. PATENT DOCUMENTS

| | | | | |
|---|---|---|---|---|
| 2,885,966 | A * | 5/1959 | Ford | F04B 43/14 |
| | | | | 417/307 |
| 2,946,291 | A * | 7/1960 | Roebig | F04C 2/04 |
| | | | | 418/56 |
| 3,408,947 | A | 11/1968 | McMillan | |
| 3,549,279 | A | 12/1970 | Grach | |
| 4,332,534 | A * | 6/1982 | Becker | F04B 43/14 |
| | | | | 418/153 |
| 5,006,049 | A | 4/1991 | Von Der Heyde et al. | |
| 5,988,998 | A * | 11/1999 | Glover | F04C 5/00 |
| | | | | 418/153 |
| 9,394,818 | B2 | 7/2016 | Brueck et al. | |
| 9,453,507 | B2 * | 9/2016 | Ghodsi-Kameneh | |
| | | | | F01C 21/08 |
| 10,240,503 | B2 * | 3/2019 | Hodgson | F01N 3/2066 |
| 2002/0001530 | A1 | 1/2002 | Doi et al. | |

FOREIGN PATENT DOCUMENTS

| | | |
|---|---|---|
| DE | 28 53 916 A1 | 6/1980 |
| DE | 38 15 252 A1 | 11/1989 |
| DE | 10 2011 015 110 B3 | 1/2012 |
| DE | 102011015110 | 1/2012 |
| EP | 0819853 | 1/1998 |
| EP | 2 636 862 A1 | 9/2013 |
| GB | 768253 A | 2/1957 |

* cited by examiner

PUMP FOR CONVEYING A FLUID, IN PARTICULAR FOR CONVEYING AN EXHAUST GAS CLEANING ADDITIVE

CROSS-REFERENCE TO RELATED APPLICATIONS

This is a U.S. national stage of application No. PCT/EP2015/069608, filed on 27 Aug. 2015, which claims priority to the German Application No. 10 2014 112 390.5 filed 28 Aug. 2014, the content of both incorporated herein by reference.

BACKGROUND OF THE INVENTION

1. Field of the Invention

The invention relates to a pump for delivering a liquid, the pump being suitable in particular for delivering a liquid exhaust-gas purification additive (such as, for example, urea-water solution) into an exhaust-gas treatment device for the purification of the exhaust gases of internal combustion engines.

2. Related Art

Exhaust-gas treatment devices in which use is made of a liquid additive for exhaust-gas purification are widely used, for example, in the automotive field. A liquid additive is used in exhaust-gas treatment devices in particular for removing nitrogen oxide compounds from the exhaust gas. The so-called SCR method (SCR=Selective Catalytic Reduction) is used in exhaust-gas treatment devices of this type. In the SCR method, nitrogen oxide compounds in the exhaust gas are reduced with the aid of a reducing agent (normally ammonia). Ammonia is normally stored in the motor vehicle not in pure form but rather in the form of a liquid (exhaust-gas) additive that is converted into ammonia outside the exhaust gas (in an external reactor provided for the purpose) and/or within the exhaust gas (in the exhaust-gas treatment device). In this context, urea-water solution is preferably used as liquid additive. A urea-water solution with a urea content of 32.5% is available under the trade name AdBlue®.

In the motor vehicle, the liquid additive is commonly stored in a tank and introduced into the exhaust-gas treatment device by a delivery unit. A delivery unit normally also has at least one pump. Furthermore, a delivery unit may also have, inter alia, the following components: filter, sensor, valve and/or dosing unit.

A problem with a delivery unit for liquid additive is that the additive can freeze at low temperatures. A 32.5% urea-water solution, for example, freezes at −11° C. In motor vehicles, such low temperatures may arise in particular during long standstill phases in winter. When the additive freezes, an increase in volume occurs that can damage or even destroy the lines, ducts and/or components of the delivery module. The freezing process is a problem in particular for a pump, because a pump is in intensive contact with the liquid additive. Destruction of the pump may, for example, be prevented by virtue of the delivery unit being evacuated upon deactivation, such that no liquid additive remains in the delivery module during a standstill phase. Another approach for protecting the pump is to provide measures in the pump for protection against freezing. For example, the pump or the components thereof may be designed to be so flexible that no damage is caused as a result of the volume expansion of the liquid additive during the freezing process.

In particular within the pump, it is technically very cumbersome to ensure measures for protection against freezing, because the pump must be in intensive contact with the liquid additive in order to be able to deliver the liquid additive. Furthermore, a complete evacuation of the pump is often problematic because a resumption of delivery after a stoppage of operation is made considerably more difficult as a result.

A pump for delivering liquid additive should also be as inexpensive as possible and exhibit high durability. This includes in particular high reliability and/or low failure probability and resistance to ageing. Here, the expression "ageing" refers in particular to a deterioration of the pump with regard to dosing accuracy and delivery rate owing to wear.

Furthermore, the pump's capability of providing an exact delivery flow rate is also frequently important. The capability of providing an exact delivery flow rate, or the analogous expression "dosing accuracy", is meant here in particular to mean that the liquid flow rate actually delivered by the pump can be predefined precisely by clearly determinable input variables, wherein here, the expression "input variable" describes in particular the electric actuation of the drive of the pump (voltage profile and/or current profile for driving the pump, frequency of current sequences for driving the pump, etc.). In particular, it is important that the number and/or relevance of cross-influences that influence the dependency of the delivery flow rate on the input variables is kept low. Such cross-influences may, for example, be the temperature of the pump, the pressure in the pump, etc. If significant cross-influences are unavoidable, it should be possible for the effect of said cross-influences on the delivery flow rate to be calculated and/or monitored as accurately as possible. The dosing accuracy of a pump can be described for example by a statistical deviation between an expected, desired delivery flow rate and an actually delivered delivery flow rate. A pump has for example a high dosing accuracy if the deviation is, on average, less than 10%. A dosing accuracy can (for urea-water solution delivery flow rates in the case of the SCR method) be considered to be low, for example, if the deviation is on average greater than 20%. These percentage values should in each case be understood merely as examples.

Documents U.S. Pat. Nos. 2,544,628, 3,408,947, DE 285 39 16 A1 and DE 381 52 52 A1 disclose a pump type also referred to as an orbital pump. This pump type is, on the one hand, relatively durable with regard to a volume expansion of a liquid in the event of freezing, and furthermore this pump type can also be operated with a reversed delivery direction, such that an evacuation of a delivery unit is possible in a simple manner by a pump of this type. There is a requirement for this pump type to be adapted to the demands in the field of the SCR method, in particular with regard to the dosing accuracy and/or ageing behavior and with regard to the resistance to urea-water solution and ice pressure.

SUMMARY OF THE INVENTION

Taking this as a starting point, it is an object of the present invention to propose a particularly advantageous pump for the delivery of a liquid, which pump at least partially solves the above problems and is in particular suitable for the delivery of liquid additives for exhaust-gas purification (such as urea-water solution).

This object may be achieved, according to one aspect of the invention, by a pump for delivering a liquid, having at least one pump housing with at least one inlet and at least one outlet and having an inner circumferential face and having a geometric axis, wherein an eccentric is arranged within the pump housing and the eccentric is movable (in eccentric fashion) relative to the pump housing about the geometric axis, wherein a deformable element is arranged in a pump gap between the inner circumferential face of the pump housing and an outer face of the eccentric, and wherein a delivery duct is formed from the at least one inlet to the at least one outlet by the deformable element and by the inner circumferential face of the pump housing, and wherein furthermore, the deformable element is pressed against the pump housing along at least one section of the delivery duct by the outer face of the eccentric such that at least one displaceable seal of the delivery duct and at least one closed pump volume are formed in the delivery duct, these being displaceable along the delivery duct from the inlet to the outlet by an eccentric movement of the eccentric for the delivery of the liquid, wherein, between the outlet and the inlet, there is provided a static seal that prevents a backflow of liquid from the outlet back to the inlet, wherein the inner circumferential face of the pump housing has a recess in the region of the static seal, and the deformable element is braced in fluid-tight fashion against the inner circumferential face in the region of the recess by a pin.

A pump with this construction can also be referred to as an orbital pump.

In one aspect, the pump has a (central) geometric axis about which the eccentric can be rotated. For this purpose, it is preferable for a drive shaft to extend along the drive axis, which drive shaft connects the eccentric to an (electrically operable) drive. The drive is preferably arranged along the axis, above and/or below the pump housing. For the description of the pump and of its components in spatial terms, a radial direction is hereinafter assumed, which radial direction is perpendicular to the geometric axis of the pump and extends outward in a radial direction proceeding from the geometric axis of the pump. A circumferential direction should likewise be defined as being perpendicular to the geometric axis and perpendicular to the radial direction and tangential to the inner circumferential face of the pump housing. The delivery duct extends at least in sections along the circumferential direction through the pump housing, or along the inner circumferential face of the pump housing, from the inlet to the outlet of the pump. For the further description of the pump, a central plane of the pump is also defined. The central plane is arranged perpendicular to the geometric axis. The pump housing, the eccentric, the deformable element and the delivery duct lie in the central plane.

The pump housing of the pump is preferably constructed in the manner of a ring or a cylindrical chamber, inside which (inside the ring or in the cylindrical chamber) the eccentric is arranged. The pump housing may also be regarded as an (external) stator of the pump, wherein the eccentric is referred to as an (internal) rotor. For a kinematic reversal, the invention is also intended to encompass constructions in which the pump housing with inlet and outlet is situated internally and the eccentric runs around the outside, wherein the pump gap is situated between the outer circumferential face of the internally situated pump housing and an inner face of the eccentric. In this embodiment of the pump, it is possible for the pump housing to form an internal stator surrounded by the eccentric. The eccentric then forms an external rotor. The inlet and the outlet are arranged on the pump housing and permit the inflow and outflow of the liquid into the pump housing and into the delivery duct.

The pump housing is preferably composed of plastic. Stiffening structures may be integrated in the pump housing. In a preferred design variant, in a pump housing composed of plastic, there is integrated an annular metallic insert which stiffens the pump housing.

In this case, the expression "eccentric" means in particular a circular structure arranged eccentrically with respect to the geometric axis and which performs an eccentric movement when it rotates about the geometric axis. An annular or encircling pump gap is formed between the pump housing and the eccentric, in which gap the deformable element is arranged. The delivery duct is arranged (within the gap) between the deformable element and the pump housing and is delimited by the pump housing and the deformable element. The pump gap has at least one constriction displaced along the pump housing or along the delivery duct by a rotation of the eccentric. At the constriction, the deformable element is pressed against the housing, such that the displaceable seal is formed there. Between the pump housing and the deformable element, the delivery duct has a duct cross section through which liquid can flow, which duct cross section may for example (depending on the size of the pump) amount to between 1 $mm^2$ [square millimeter] and 50 $mm^2$ at the largest point.

The delivery duct is preferably formed annularly, or in an encircling manner, around the axis. The inlet and the outlet are preferably arranged with an angular spacing of greater than 270° with respect to one another (measured in the central plane) in a delivery direction of the pump. Counter to the delivery direction, the inlet and the outlet thus have an angular spacing of less than 90° with respect to one another.

The eccentric is preferably of multi-part form. The eccentric preferably has an inner eccentric region that performs an eccentric rotational movement. Furthermore, an outer ring may be provided that surrounds the inner region. It is preferable for at least one bearing to be situated between the inner region and the outer ring. The bearing may be a ball bearing or a roller bearing. The inner eccentric region of the eccentric performs a rotational movement about the axis during operation. The eccentric arrangement gives rise to an eccentric movement. The eccentric movement is transmitted to the outer ring. By a bearing between the inner eccentric region and a ring, an eccentric rotational movement of the inner eccentric region can be converted into an eccentric wobbling movement of the ring without the rotational movement component of the movement of the inner region also being transmitted. The fact that the movement of the ring does not have a rotational movement component makes it possible for shear stresses in the deformable element and internal friction forces in the pump to be reduced. The deformable element is flexed owing to the movement of the eccentric. It is preferable for only pressure forces and substantially no friction forces to act at a contact surface of the eccentric and of the deformable element. A corresponding division of the eccentric into an inner eccentric region and an outer ring is also possible if the eccentric is an external rotor arranged around an (inner) pump housing. It is also possible for the outer ring to be dispensed with and for the rollers of the bearing to roll directly on or against the deformable element.

As already described further above, the deformable element is, to form the displaceable seal, pressed in regions or in sections against the inner circumferential face of the pump housing. At the seal, there is (linear or areal) contact between the deformable element and the inner circumferential face of the pump housing, which has the effect that the liquid cannot flow through. In other words, the deformable element bears fully against the pump housing in the region of the displaceable seal, such that the duct cross section has no cross-sectional area in the region of the displaceable seal. The delivery duct is accordingly interrupted in the region of the displaceable seal. It is thus also the case that at least one closed pump volume is formed within the delivery duct. The reference to a closed pump volume means that there is a section of the delivery duct that is closed off at least on one side (upstream or downstream along the delivery duct). By a displacement of the displaceable seal, the at least one closed pump volume is also displaced, such that the liquid situated in the closed pump volume is delivered. It is preferable if, during the operation of the pump, multiple closed pump volumes are displaced from the inlet of the pump to the outlet of the pump in order to deliver the liquid. In this way, a closed pump volume is created (meaning closed off at least on one side) in the vicinity of the inlet and is then eliminated (meaning opened again at least on one side) at the outlet. At the inlet, a closed pump volume is closed off by a displaceable seal only on one side, in a downstream direction, and is connected in an upstream direction to the inlet, such that the liquid can flow through the inlet into the closed pump volume. At the outlet, the closed pump volume is (still) closed off by a seal (only) on one side, this however being in an upstream direction, and the closed pump volume is connected in a downstream direction to the outlet, such that the liquid can flow through the outlet out of the closed pump volume. In between (on the path of the closed pump volume from the inlet to the outlet), there is a phase in which the closed pump volume is closed off by the at least one displaceable seal in the upstream and downstream directions.

The deformable element may also be referred to as a deformable diaphragm. Here, the expression "diaphragm" does not imperatively specify whether the deformable element has an areal extent. The expression "diaphragm" should be understood as an indication that the deformable element is a flexible structure that can be deformed for the delivery of liquid. As material for the deformable element or the deformable diaphragm, use is preferably made of an elastomer material (for example natural rubber or latex). To increase the durability and/or to establish and maintain the flexibility, the material of the deformable element may include additives. The deformable element is preferably flexible in all directions (in the axial direction, in the radial direction and in the circumferential direction). It is, however, also possible for the deformable element to exhibit partially directional flexibility. The deformable element may, for example, exhibit greater flexibility in the radial direction than in the circumferential direction and in the axial direction. A deformation of the deformable element in one direction typically also causes a deformation in other directions. The deformable element expands for example in the axial direction and/or in the circumferential direction when compressed in the radial direction.

On the pump, there is also provided a static seal which prevents an undesired backflow of liquid from the outlet to the inlet (counter to the delivery direction). The static seal is formed by a recess in the pump housing, in which the inner circumferential face of the pump housing is outward from the geometric axis. Here, the expression "recess" is also intended to express that, here, the inner circumferential face is set back from the geometric axis of the pump. The deformable element preferably has, in the region of the recess, a protuberance whose form substantially corresponds to the form of the recess and which accordingly likewise extends outward from the geometric axis. The deformable element preferably has, in the region of the protuberance, an opening which extends through the deformable element in an axial direction. The pin is inserted into the opening. The opening is not connected to the delivery duct. A (web-like) section of the pump housing extends between the opening or the pin and the inner circumferential face of the pump housing. The material of the deformable element is braced in fluid-tight fashion between the pin and the inner circumferential face of the pump housing. For this purpose, the pin presses the (web-like) section of the deformable element against the inner circumferential face of the pump housing in the recess. A static seal that is formed by such a recess and such a pin prevents a backflow of liquid from the outlet back to the inlet in a particularly effective manner. In particular, it is possible for the deformable element and the pump housing to be designed specifically for the static seal in the region of the recess.

The pump is furthermore advantageous if the pin is arranged in the recess such that the pin is situated outside a cylindrical basic form formed by the inner circumferential face.

The cylindrical basic form corresponds to a major part of the inner circumferential face of the pump housing. In particular, that section of the inner circumferential face situated between the inlet and the outlet in the delivery direction corresponds to the cylindrical basic form. This section preferably corresponds to more than 270° of the cylindrical basic form. The recess in which the pin is arranged is accordingly merely a local deviation from the cylindrical basic form in the region of the static seal between the outlet and the inlet.

By the positioning of the pin in the recess outside the cylindrical basic form, it can be ensured that the eccentric of the pump moves independently of the static seal even in the region of the static seal. In particular, the static seal preferably has no effect on the forces that arise during the (rotational) movement of the eccentric.

The pump is furthermore advantageous if the inner circumferential face has a cylindrical basic form and the delivery duct is formed by the inner circumferential face and by a concave duct surface of the deformable element, wherein the deformable element and the inner circumferential face bear against one another in each case at at least one annular contact seal at both sides of the delivery duct as viewed in the axial direction.

The deformable element is itself normally of annular or cylindrical form. The deformable element preferably has, (preferably on both sides) in an axial direction along the geometric axis, a radially projecting protrusion extending along the full circumference of the deformable element. The concave duct surface is formed at least partially by the annular protrusion. In this context, the expression "concave" means that a type of channel is formed on the outer face of the deformable element.

The channel on the outer face of the deformable element may for example be formed between two annular protrusions on both sides in the edge region of the deformable element, between which protrusions there is a set-back region of the surface of the deformable element. In further design variants, it is, however, also possible for the surface of the deformable element to be entirely of concave form, or an annular protrusion is formed on the deformable element only at one side.

It is, however, preferable for the inner circumferential face to be flat or planar in the axial direction in the region of a central plane of the pump, and for the concave duct surface of the deformable element to be formed by the annular protrusions. The diameter of the deformable element preferably increases (slightly) to both sides of the central plane of the pump.

A cross-sectional area of the delivery duct in a plane spanned by the axial direction and radial direction is accordingly delimited by a rectilinear section of the inner circumferential face of the pump housing and by a concave section of the deformable element.

It has been found that this design of the cross-sectional area of a delivery duct of an orbital pump has considerable advantages in relation to a configuration of the duct cross section with a concave surface of the pump housing and with a planar configuration, in the axial direction, of the deformable element. In particular, the cylindrical basic form of the inner circumferential face permits uniform deformation of the deformable element under the pressure in the delivery duct, with uniform displacement of the annular contact seals in the axial direction to the inside or to the outside.

The pump is furthermore advantageous if the deformable element has in each case a multiplicity of radially encircling sealing lips at both sides of the delivery path, which sealing lips bear against the inner circumferential face of the pump housing and form the annular contact seals.

It has been found that a very much greater sealing action can be ensured at the annular contact seals if in each case a multiplicity of radially encircling sealing lips is provided instead of a single sealing lip. The sealing lips are preferably composed of the material of the deformable element.

The pump is furthermore advantageous if the deformable element has, in the region of the static seal, a multiplicity of sealing lips that run parallel to the geometric axis and that bear against the inner circumferential face of the pump housing in the recess and thus form the static seal.

It is also the case at the static seal that an increased sealing action can be achieved by a multiplicity of sealing lips.

The sealing lips that form the annular contact seals and the sealing lips that form the static seal preferably merge into one another. This may be ensured by virtue of the sealing lips intersecting one another.

It is particularly preferable if, to both sides of the eccentric in the axial direction, the deformable element is arranged in each case between the inner circumferential face and a centering ring, wherein the deformable element is pressed by the centering rings against the inner circumferential face of the pump housing in each case, such that in each case one annular contact seal is formed.

The deformable element is braced against the pump housing, or against the inner circumferential face of the pump housing, in each case by the centering rings. The centering rings bear in each case against the inside of the deformable element, and a gap between the centering rings and the pump housing is designed such that the deformable element is squeezed between the centering rings and the pump housing (or the inner circumferential face of the pump housing). By way of the centering rings, it is possible to ensure a particularly uniform and self-centering form of the annular contact seals, with sealing forces that are substantially uniform over the entire circumference of the pump housing. Uniform sealing forces make it possible to attain an intense sealing action of the pump with simultaneously minimal deformation of the deformable element. In particular, local overstretching of the deformable element is prevented in this way.

The pump is furthermore advantageous if the centering rings arranged at both sides of the eccentric have, in the region of the static seal, a protuberance that projects into the recess of the inner circumferential face of the pump housing.

Such centering rings with a protuberance can likewise exhibit a self-centering action if the centering rings exhibit adequate play in the protuberance, such that the self-centering capability is maintained. Owing to the protuberance, however, a direct and uninterrupted transition between the static seal and the radial contact seals is additionally possible.

The centering rings preferably terminate flush with the pin at the static seal, such that the compression of the deformable element between the centering rings and the pump housing and between the pin and the pump housing merge directly into one another. In particular, a pressure exerted on the deformable element by the centering rings is of exactly the same magnitude as a pressure exerted on the deformable element by the pin.

In a further advantageous design variant, the pin fixes the centering rings in the region of the static seal.

In this way, a rotation of the centering rings relative to the pump housing is prevented. If appropriate, the pin fixes the centering rings in a manner that nevertheless permits a (small) movement of the centering rings relative to the pump housing. Then, the capability of the centering rings to center themselves in the pump housing is not impaired by the fixing.

It is also sought here to describe a motor vehicle having an internal combustion engine and having an exhaust-gas treatment device for the purification of the exhaust gases of the internal combustion engine, which exhaust-gas treatment device has an SCR catalytic converter with which the SCR process can be performed, wherein a liquid for exhaust-gas purification can be fed to the SCR catalytic converter by a described pump.

BRIEF DESCRIPTION OF THE DRAWINGS

The invention and the technical field will be explained in more detail below on the basis of the figures. It is pointed out that the figures are merely schematic and show merely preferred exemplary embodiments of the invention. In particular, the proportions illustrated in the figures should be understood merely as being schematic. In the figures.

DETAILED DESCRIPTION OF THE PRESENTLY PREFERRED EMBODIMENTS

Figure 1:
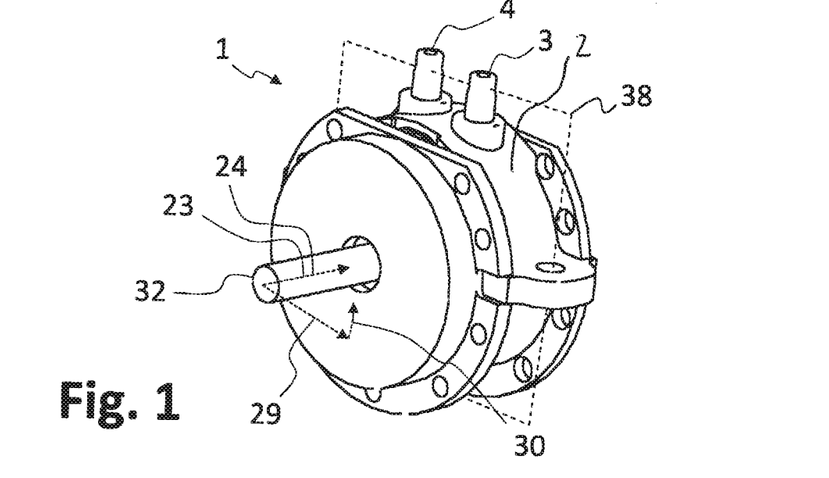
FIG. 1: shows an isometric view of a described pump.

FIG. 1 illustrates the described pump 1 in an isometric view from the outside. The figure shows the pump housing 2 with the inlet 3 and the outlet 4. Also shown is a drive shaft 32 by which the eccentric (not illustrated here) in the pump housing 2 can be driven. An axial direction 24 and a geometric axis 23 of the pump 1 are defined along the drive shaft 32. Furthermore, a radial direction 29 is defined as being perpendicular to the axial direction 24 and the geometric axis 23, and a tangential circumferential direction 30 is defined as being perpendicular to the axial direction 24 and to the geometric axis 23. The coordinate system formed from axial direction 24, radial direction 29 and circumferential direction 30 will hereinafter be used for the spatial description of the pump. FIG. 1 furthermore indicates a central plane 38 of the pump 1.

Figure 2:
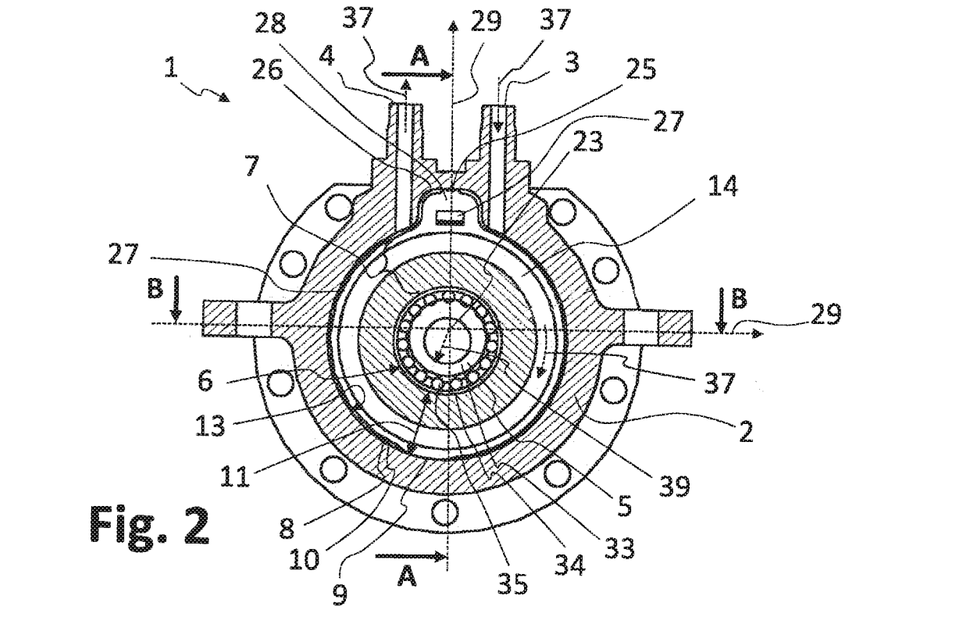
FIG. 2: shows a section through a described pump.

FIG. 2 shows a section through the pump 1 illustrated in FIG. 1, perpendicular to the radial direction 24 from FIG. 1, in the central plane 38 of the pump 1. It can be seen that the central plane 38 intersects the pump housing 2 in the plane in which the inlet 3 and the outlet 4 are also situated. For orientation, the illustration also shows two different radial directions 29 that are perpendicular to one another, wherein said radial directions 29 are oriented on the basis of the inlet 3 and of the outlet 4 of the pump 1. The eccentric 5 is situated in the pump housing 2. The eccentric 5 has an inner eccentric region 33 with an eccentricity 39, an eccentric bearing 35 and an outer ring 34. Between an outer face 6 of the eccentric 5 and an inner circumferential face 13 of the pump housing 2 there is situated a pump gap 11 in which the deformable element 7 is arranged. Between the deformable element 7 and the pump housing 2, there is situated a delivery duct 8, which connects the inlet 3 to the outlet 4 and through which the liquid can be delivered along the delivery direction by a movement of the eccentric 5. For this purpose, the deformable element 7 bears against a displaceable seal 9 on the inner circumferential face 13 of the pump housing 2 and divides the delivery duct 8 into displaceable pump volumes 10.

Between the inlet 3 and the outlet 4 there is formed a static seal 25 which, independently of the position of the eccentric 5, ensures fluid-tight contact between the pump housing 2 and the deformable element 7 and thus prevents a backflow of liquid from the outlet 4 to the inlet 3 counter to the delivery direction 37. The static seal 25 is formed by a recess 26 in the inner circumferential face 13 of the pump housing 2, in which recess the deformable element 7 is braced firmly against the pump housing 2, or against the inner circumferential face 13 of the pump housing 2, by way of a pin 27.

Figure 3:
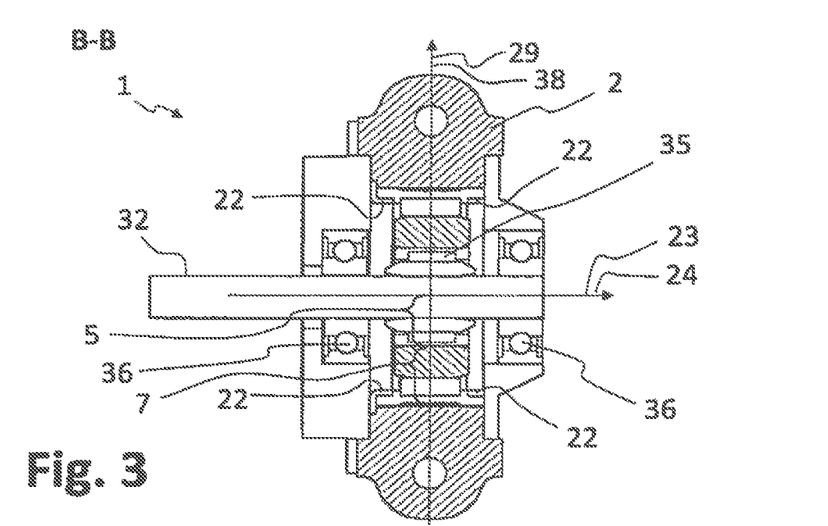
FIG. 3: shows a further section through a described pump along the section direction B-B illustrated in FIG. 2.

FIG. 3 shows a section through the pump 1 along the section direction B-B illustrated in FIG. 2. For orientation, this figure shows the radial direction 29, the axial direction 24, the central plane 38 and the geometric axis 23 of the pump. The drive shaft 32 of the pump 1 also runs along the axial direction. The figure shows the pump housing 2 with the eccentric 5 arranged therein, the eccentric having the inner eccentric region 33, outer ring 34 and interposed eccentric bearing 35. The figure also shows the deformable element 7. The drive shaft 32 is mounted, on both sides of the deformable element 7 in the axial direction 24, in a respective shaft bearing 36. In the axial direction 24, the deformable element 7 is furthermore supported at both sides by centering rings 22, which press the deformable element 7 against the pump housing 2 in each case with an annular contact seal 20. Accordingly, the delivery duct 8 is formed between the pump housing 2 and the eccentric 5, or between the pump housing 2 and the deformable element 7, the delivery duct being delimited at both sides (in the axial direction 24) by annular contact seals 20.

Figure 4:
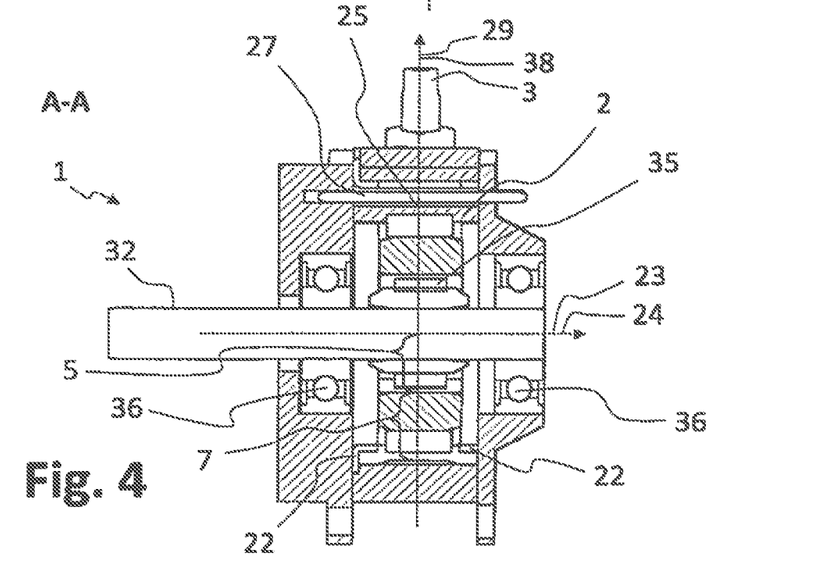
FIG. 4: shows a further section through a described pump along the section direction A-A illustrated in FIG. 2.

FIG. 4 shows a section through the pump 1 along the section direction A-A illustrated in FIG. 2, wherein the section substantially corresponds to the section illustrated in FIG. 2. The section direction A-A is however defined such that, in the upper region, the section passes through the static seal 25. The figure shows the deformable element 7 at the static seal 25, wherein a pin 27 presses the deformable element 7 against the pump housing 2.

Figure 5:
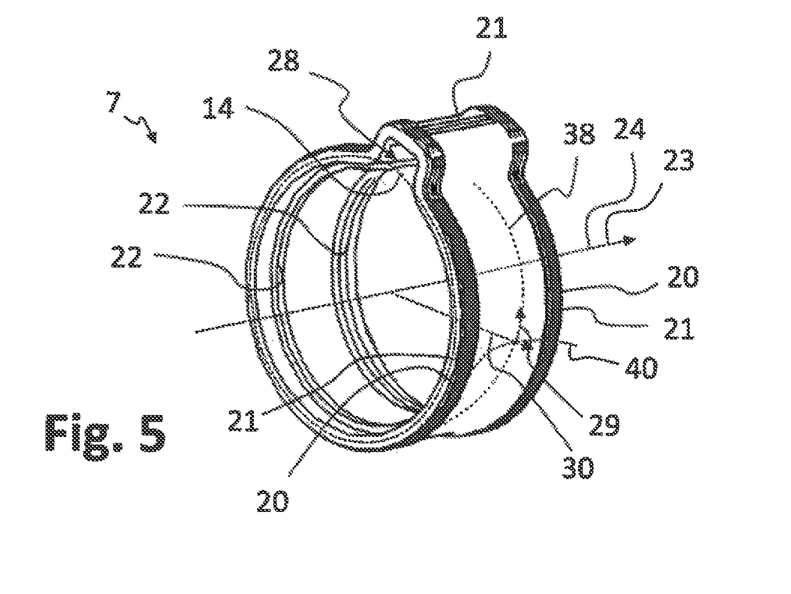
FIG. 5: is an isometric illustration of a deformable element of a described pump.

FIG. 5 shows an isometric view of a deformable element 7 for the described pump. For orientation, the geometric axis 23, the axial direction 24, the radial direction 29 and the circumferential direction 30 are illustrated here. The position of the central plane 38 is indicated by a dashed line. On the deformable element 7 there are formed sealing lips 21 by which the deformable element 7 bears in fluid-tight fashion against the pump housing of the pump, such that annular contact seals 20 are formed between the pump housing (not illustrated here) and the deformable element 7 in order to delimit the delivery duct. To form the static seal and to receive a pin for forming the static seal, the deformable element 7 has a protuberance 28 into which a pin can be placed in order to form the static seal. On both sides in the axial direction 24, centering rings are also formed on the deformable element, by which centering rings the sealing lips 21 of the deformable element 7 can be pressed against the pump housing of the pump in order to form the annular contact seals 20. Also illustrated by dashed lines is a concave duct surface 40 of the deformable element 7.

The concave form of the duct surface 40 arises, as per FIG. 5, owing to the sealing lips 21 which, on both sides of the central plane 38 in the axial direction 24, bear against the pump housing (not illustrated here). The sealing lips 21 have the effect that the deformable element 7 has a smaller diameter in the region of the central plane 38 than to the sides of the central plane 38.

Figure 6:
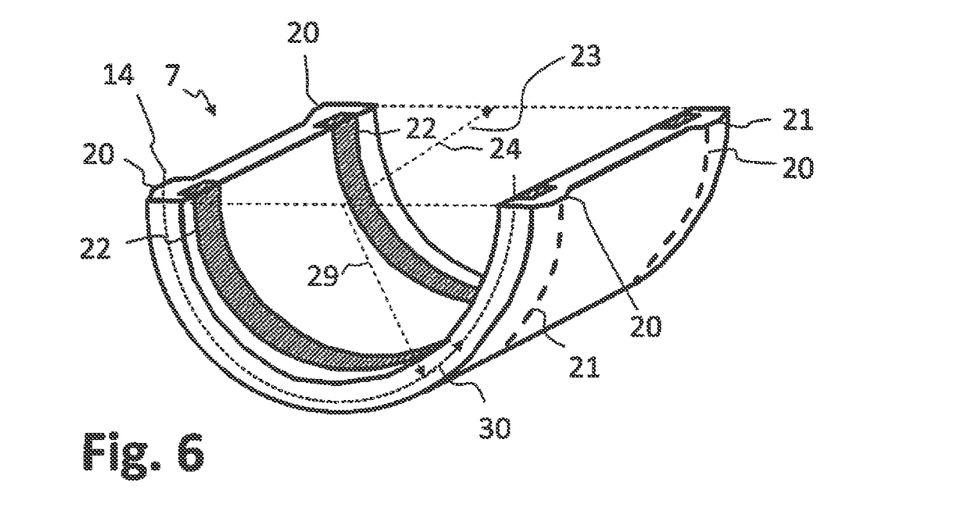
FIG. 6: is an isometric sectional illustration through the deformable element from FIG. 5.

For better understanding, the deformable element 7 illustrated in FIG. 5 is illustrated once again, in section, in FIG. 6. For orientation, the geometric axis 23, the axial direction 24, the radial direction 29 and the circumferential direction 30 are plotted here too. The figure shows here the centering rings 22, which are arranged on the deformable element 7 at both sides in the axial direction 24. The figure indicates, as bead-like elevations, the sealing lips 21 of the deformable element and, by dashed lines, the annular contact seals 20 by which the sealing lips 21 bear in fluid-tight fashion against the pump housing (not illustrated here).

Figure 7:
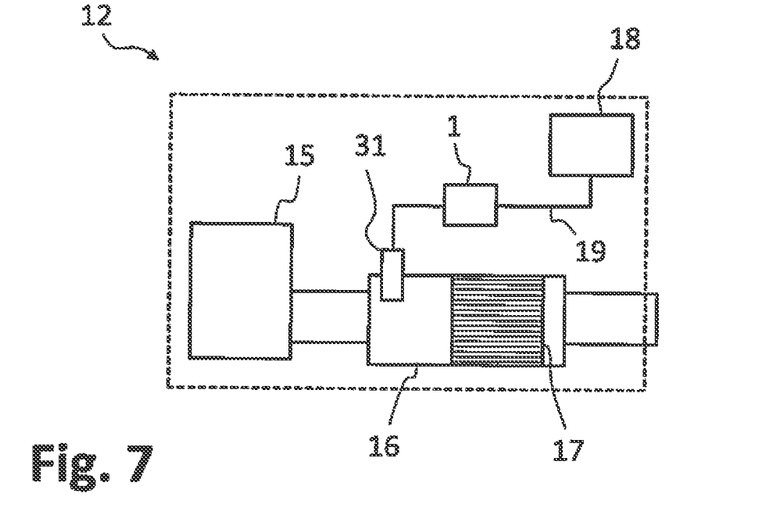
FIG. 7: shows a motor vehicle having a described pump.

FIG. 7 shows a motor vehicle 12 having an internal combustion engine 15 and having an exhaust-gas treatment device 16 for the purification of the exhaust gases of the internal combustion engine 15. In the exhaust-gas treatment device 16 there is arranged an SCR catalytic converter 17 by which the method of selective catalytic reduction can be carried out. For this purpose, liquid additive for exhaust-gas purification is fed to the exhaust-gas treatment device 16 by an injector 31. The liquid additive is delivered from a tank 18 to the injector 31 via a line 19 by a pump 1 as described above.

Owing to the described invention, an orbital pump is disclosed which exhibits particularly uniform delivery behavior and high reliability against a backflow of liquid from an outlet of the pump back to the inlet of the pump.

It is pointed out that the features explained in the individual patent claims may be combined with one another in any desired technologically meaningful way and may be supplemented by explanatory facts from the description, with further design variants of the pump being specified.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE NUMERALS

1 Pump
2 Pump housing
3 Inlet
4 Outlet
5 Eccentric
6 Outer face
7 Deformable element
8 Delivery duct
9 Displaceable seal
10 Pump volume
11 Pump gap
12 Motor vehicle
13 Inner circumferential face
14 Cylindrical basic form
15 Internal combustion engine
16 Exhaust-gas treatment device
17 SCR catalytic converter
18 Tank
19 Line
20 Annular contact seal
21 Sealing lip
22 Centering ring
23 Geometric axis
24 Axial direction
25 Static seal
26 Recess
27 Pin
28 Protuberance
29 Radial direction
30 Circumferential direction
31 Injector
32 Drive shaft
33 Inner eccentric region
34 Outer ring
35 Eccentric bearing
36 Shaft bearing
37 Delivery direction
38 Central plane
39 Eccentricity
40 Duct surface

The invention claimed is:

1. A pump (1) for delivering a liquid, comprising:
a pump housing (2) having at least one inlet (3), at least one outlet (4), and an inner circumferential face (13) forming a cylindrical basic form (14);
a drive shaft (32) defining a geometric axis (23) and axial direction (24) of the pump (1);
an eccentric (5) arranged within the pump housing (2), the eccentric (5) being movable relative to the pump housing (2) about the geometric axis (23), the eccentric (5) having an outer face (6);
a deformable element (7) arranged in a pump gap (11) between the inner circumferential face (13) of the pump housing (2) and the outer face (6) of the eccentric (5);
a delivery duct (8) extending from the at least one inlet (3) to the at least one outlet (4) by the deformable element (7) and by the inner circumferential face (13) of the pump housing (2);
a static seal (25) arranged between the at least one outlet (4) and the at least one inlet (3), the static seal (25) being configured to prevent a backflow of the liquid from the at least one outlet (4) back to the at least one inlet (3); and
centering rings (22) arranged at both sides of the eccentric (5), wherein the deformable element (7) is pressed by the centering rings (22) against the inner circumferential face (13) of the pump housing (2) in each case, such that in each said case one annular contact seal (20) is formed,
wherein the deformable element (7) is pressed against the pump housing (2) along at least one section of the delivery duct (8) by the outer face (6) of the eccentric (5) such that at least one displaceable seal (9) of the delivery duct (8) and at least one closed pump volume (10) are formed in the delivery duct (8), the at least one displaceable seal (9) and the at least one closed pump volume (10) being displaceable along the delivery duct (8) from the at least one inlet (3) to the at least one outlet (4) by an eccentric movement of the eccentric (5) for the delivery of the liquid, and
wherein the inner circumferential face (13) of the pump housing (2) has a recess (26) in a region of the static seal (25), and the deformable element (7) is braced in fluid-tight fashion against the inner circumferential face (13) in a region of the recess (26) by a pin (27), the pin (27) being configured to fix the centering rings (22) in the region of the static seal (25).

2. The pump (1) according to claim 1, wherein the pin (27) is arranged in the recess (26) such that the pin (27) is arranged outside the cylindrical basic form (14).

3. The pump (1) according to claim 1, wherein the delivery duct (8) is formed by the inner circumferential face (13) and by a concave duct surface of the deformable element (7), wherein the deformable element (7) and the inner circumferential face (13) bear against one another at the annular contact seal (20) at both sides of the delivery duct (8) as viewed in the axial direction (24).

4. The pump (1) according to claim 3, wherein the deformable element (7) has a plurality of radially encircling sealing lips (21) at the both sides of the delivery duct (8), which the plurality of radially encircling sealing lips (21) bear against the inner circumferential face (13) of the pump housing (2) and form the annular contact seal (20).

5. The pump (1) according to claim 1, wherein the deformable element has, in the region of the static seal (25), a plurality of sealing lips (21) which run parallel to the geometric axis (23) and which bear against the inner circumferential face (13) of the pump housing (2) in the recess (26) and form the static seal (25).

6. The pump (1) according to claim 1, wherein, with respect to the both sides of the eccentric (5) in the axial direction (24) of the pump, the deformable element (7) is arranged between the inner circumferential face (13) and the centering rings (22) arranged at the both sides of the eccentric (5).

7. The pump (1) according to claim 6, wherein the centering rings (22) arranged at the both sides of the eccentric (5) have, in the region of the static seal (25), a protuberance (28) projecting into the recess (26) of the inner circumferential face (13) of the pump housing (2).

8. A motor vehicle (12) comprising: an internal combustion engine (15); and an exhaust gas treatment device (16) for purification of exhaust gases of the internal combustion engine (15), the exhaust gas treatment device having a selective catalytic reduction (SCR) catalytic converter (17) configured to perform the SCR process, wherein the liquid for exhaust gas purification is feedable to the SCR catalytic converter (17) by the pump (1) according to claim 1.

9. A pump (1) for delivering a liquid, comprising:
- a pump housing (2) having at least one inlet (3), at least one outlet (4), and an inner circumferential face (13) forming a cylindrical basic form (14);
- a drive shaft (32) defining a geometric axis (23) and axial direction (24) of the pump (1);
- an eccentric (5) arranged within the pump housing (2), the eccentric (5) being movable relative to the pump housing (2) about the geometric axis (23), the eccentric (5) having an outer face (6);
- a deformable element (7) arranged in a pump gap (11) between the inner circumferential face (13) of the pump housing (2) and the outer face (6) of the eccentric (5);
- a delivery duct (8) extending from the at least one inlet (3) to the at least one outlet (4) by the deformable element (7) and by the inner circumferential face (13) of the pump housing (2); and
- a static seal (25) arranged between the at least one outlet (4) and the at least one inlet (3), the static seal (25) being configured to prevent a backflow of the liquid from the at least one outlet (4) back to the at least one inlet (3), wherein the deformable element (7) is pressed against the pump housing (2) along at least one section of the delivery duct (8) by the outer face (6) of the eccentric (5) such that at least one displaceable seal (9) of the delivery duct (8) and at least one closed pump volume (10) are formed in the delivery duct (8), the at least one displaceable seal (9) and the at least one closed pump volume (10) being displaceable along the delivery duct (8) from the at least one inlet (3) to the at least one outlet (4) by an eccentric movement of the eccentric (5) for the delivery of the liquid, wherein the inner circumferential face (13) of the pump housing (2) has a recess (26) in a region of the static seal (25), and the deformable element (7) is braced in fluid-tight fashion against the inner circumferential face (13) in a region of the recess (26) by a pin (27), wherein, with respect to both sides of the eccentric (5) in the axial direction (24), the deformable element (7) is arranged between the inner circumferential face (13) and centering rings (22) arranged at the both sides of the eccentric (5), wherein the deformable element (7) is pressed by the centering rings (22) against the inner circumferential face (13) of the pump housing (2) in each case, such that in each said case one annular contact seal (21) is formed, wherein the centering rings (22) arranged at the both sides of the eccentric (5) have, in the region of the static seal (25), a protuberance (28) projecting into the recess (26) of the inner circumferential face (13) of the pump housing (2), and wherein the pin (27) is configured to fix the centering rings (22) in the region of the static seal (25).

* * * * *